Patented Sept. 3, 1940

2,213,608

UNITED STATES PATENT OFFICE 2,213,608

ACID WOOL DYESTUFFS

Heinrich Ritter, Frankfort-on-the-Main-Fechenheim, Germany, assignor to General Aniline & Film Corporation, a corporation of Delaware No Drawing. Application December 7, 1938, Serial No. 244,385. In Germany December 12, 1937

4 Claims. (Cl. 260—465)

This invention relates to valuable new acid wool dyestuffs, more particularly to those of the general formula:

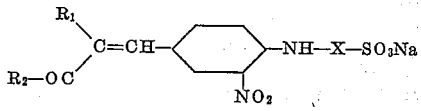

wherein $R_1$ stands for a member selected from the group consisting of hydrogen and the cyanic group, $R_2$ for a member selected from the group consisting of —$NH_2$, —OH and —O-alkyl groups, and X stands for a member selected from the group consisting of unsubstituted radicals of the general formulae:

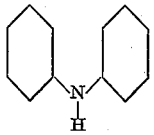

and

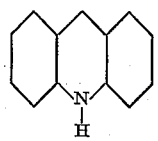

The new dyestuffs are obtained by condensing nitro compounds of the general formula:

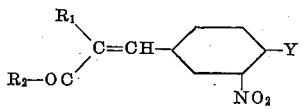

wherein $R_1$ and $R_2$ have the above said signification and Y stands for a member selected from the group, consisting of halogen and alkoxy, with aminosulfonic acids of the diarylamine and carbazole series.

The condensation may be carried out by heating the initial materials in the presence of acid-binding agents such as for example sodium acetate, calcium hydroxide, calcium carbonate and the like in an aqueous medium or in an organic diluent with or without the simultaneous addition of water either in an open vessel provided with a reflux condenser or in a closed vessel under pressure.

The new dyestuffs thus obtained dye animal fibers various shades of very good levelling power and fastness properties, partly of an excellent fastness to light, partly of an especially good fastness to washing, ironing, sea water and perspiration.

In order to further illustrate my invention the following examples are given the parts being by weight and all temperatures in degrees centigrade.

Example 1

A mixture of 26.4 parts of 4-aminodiphenylamine-2-sulfonic acid, 28 parts of 4-chloro-3-nitrobenzylidene-cyanacetic acid ester, 14 parts of potassium carbonate and about 300 parts of alcohol is heated to boiling for about 8 hours in an apparatus provided with a reflux condenser. When cool the condensation product thus formed is isolated and may be purified for instance by redissolving it in water and precipitating the filtrated solution by adding sodium chloride. The new dyestuff of the formula:

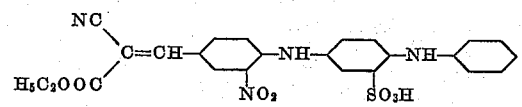

dyes wool brown shades of a particular levelling power and a good fastness to light.

The aforesaid 4-chloro-3-nitrobenzylidenecyanacetic acid ester crystallizes from benzene as colorless needles of 143° melting point and may be prepared by adding to an alcoholic solution of equimolecular proportions of 4-chloro-3-nitrobenzaldehyde and cyanacetic acid ethylester a little amount of piperidine and shortly warming at about 80°.

Very similar dyestuffs are obtained when using as the one reaction component 4-chloro-3-nitrobenzylidene-cyanacet-amide (colorless needles from methanole of 163° melting point) or 4-chloro-3-nitrobenzylidene malonitrile (colorless needles from alcohol of 140° melting point).

When using as the other reaction component derivatives of the 4-aminodiphenylamine-2-sulfonic acid such as for instance the 2'-methoxy- or 4'-methoxy compound, somewhat more dark dyestuffs are obtained, whereas by the application of 3-amino-N-ethyl-carbazole-6-sulfonic acid lighter dyestuffs are obtained.

Example 2

A mixture of 26.4 parts of 4-aminodiphenyl-amine-2-sulfonic acid, 22.8 parts of 4-chloro-3-nitro-cinnamic acid, 16 parts of sodium carbonate and about 200 parts of water is heated to boiling for about 30 hours. Then in order to remove some unchanged initial product to the dark brown solution dilute hydrochloric acid until an acid reaction is added and the solution is purified by filtration. The dyestuff of the formula:

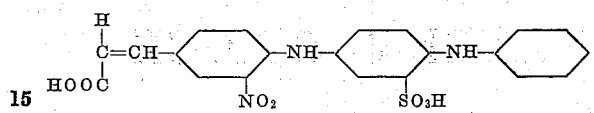

is isolated by adding sodium chloride to the solution. It dyes wool strong reddish brown shades of a remarkable fastness.

The 4-chloro-3-nitrocinnamic acid represents colorless needles of 184 to 185° melting point. It may be obtained for instance according to Perkin's reaction by starting from 4-chloro-3-nitro-benzaldehyde.

A similar reddish brown dyestuff is obtained when using as the one reaction component 4'-chloro-3'-nitrobenzalacetophenone (slightly yellow needles of 144 to 145° melting point, obtainable for instance by condensing 4-chloro-3-nitro-benzaldehyde and acetophenone).

I claim:

1. Acid wool dyestuffs of the general formula:

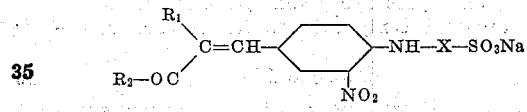

wherein $R_1$ stands for a member selected from the group consisting of hydrogen and the cyanic group, $R_2$ for a member selected from the group consisting of —$NH_2$, —OH and —O-alkyl groups, and X stands for a member selected from the group consisting of unsubstituted and substituted radicals of the general formulae:

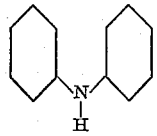

and

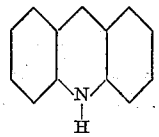

which dyestuffs dye animal fibers various shades of very good fastness properties.

2. The acid wool dyestuff of the formula:

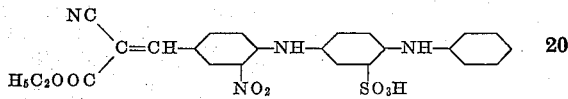

which dyes wool brown shades of a particular levelling power and a good fastness to light.

3. The acid wool dyestuff of the formula:

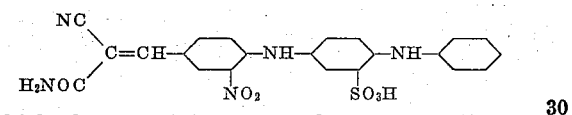

which dyes wool brown shades of a particular levelling power and a good fastness to light.

4. The acid wool dyestuff of the formula:

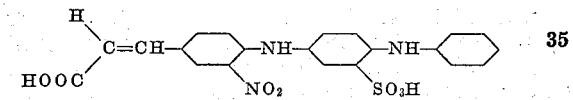

which dyes wool strong reddish brown shades of a remarkable fastness.

HEINRICH RITTER.